(12) United States Patent
Lapalme

(10) Patent No.: US 7,365,766 B1
(45) Date of Patent: Apr. 29, 2008

(54) VIDEO-ASSISTED APPARATUS FOR HEARING IMPAIRED PERSONS

(75) Inventor: Marie Lapalme, 788 Louis Normandin Street, Boucherville, Québec (CA) J4B 3X3

(73) Assignee: Marie Lapalme, Boucherville, Québec (CA)

( * ) Notice: Subject to any disclaimer, the term of this patent is extended or adjusted under 35 U.S.C. 154(b) by 1547 days.

(21) Appl. No.: 09/642,052

(22) Filed: Aug. 21, 2000

(51) Int. Cl.
H04N 7/18 (2006.01)

(52) U.S. Cl. .......................................... 348/61; 348/77

(58) Field of Classification Search ................. 348/61, 348/77, 143, 723, 724; 379/433.03; 455/117, 455/345, 550, 575; 345/723; 370/329; 714/821; H04N 7/18
See application file for complete search history.

(56) References Cited

U.S. PATENT DOCUMENTS

| | | | |
|---|---|---|---|
| 2,479,198 A | | 8/1949 | Baker |
| 3,192,321 A | | 6/1965 | Nassimbene |
| 4,352,200 A | * | 9/1982 | Oxman ........................ 455/345 |
| 4,368,459 A | | 1/1983 | Sapora |
| 4,546,383 A | | 10/1985 | Abramatic et al. |
| 4,915,626 A | | 4/1990 | Lemmey |
| 4,975,960 A | | 12/1990 | Petajan |
| 5,086,464 A | | 2/1992 | Groppe |
| 5,128,755 A | * | 7/1992 | Fancher ....................... 348/724 |
| 5,313,522 A | | 5/1994 | Slager |
| 5,473,726 A | | 12/1995 | Marshall |
| 5,491,507 A | | 2/1996 | Umezawa et al. |
| 5,568,205 A | * | 10/1996 | Hurwitz ....................... 348/723 |
| 5,627,902 A | | 5/1997 | Ziarati |
| 5,721,783 A | | 2/1998 | Anderson |
| 5,742,335 A | | 4/1998 | Cannon |
| 5,798,931 A | | 8/1998 | Kaehler |
| 5,806,036 A | | 9/1998 | Stork |
| 5,844,601 A | | 12/1998 | McPheely et al. |
| 5,850,439 A | | 12/1998 | Yang |
| 5,867,223 A | | 2/1999 | Schindler et al. |
| 5,884,197 A | * | 3/1999 | Ricardo et al. ............. 455/575 |
| 5,886,735 A | | 3/1999 | Bullister |
| 5,903,574 A | * | 5/1999 | Lyons ........................ 714/821 |

(Continued)

FOREIGN PATENT DOCUMENTS

EP    0 457 053 A2    11/1991

(Continued)

OTHER PUBLICATIONS

Bratakos, <<The Effect of Imprefect Cues on the Reception of Cued Speech>>, MIT Department of Electrical Engineering and Computer Science, pp. 1-55 (Publication Aug. 23, 1995).

(Continued)

*Primary Examiner*—Anand Rao
(74) *Attorney, Agent, or Firm*—Ogilvy Renault LLP

(57) ABSTRACT

There is described a method for providing audio and visual communication between a speaker and at least one hearing impaired person. The method comprises the steps of providing the speaker with a headset frame having a camera attached thereto and positioned to capture images of the speaker's mouth; providing the hearing impaired person with a display; capturing continuous video images of the speaker's mouth using the camera; and transmitting the images in the real-time to the display for the hearing impaired person to view such that movement of the speaker's mouth coincides with sound emitted by the speaker.

19 Claims, 2 Drawing Sheets

U.S. PATENT DOCUMENTS 5,907,351 A      5/1999   Chen et al.
6,058,315 A *   5/2000   Clark .................... 379/433.03
6,154,207 A *   11/2000   Farris et al. ................ 345/723
6,331,972 B1 *   12/2001   Harris et al. ................ 370/329

FOREIGN PATENT DOCUMENTS

| | | |
|---|---|---|
| EP | 0 618 471 A2 | 10/1994 |
| JP | PCT/JP85/00398 | 7/1985 |
| JP | 06-141308 | 5/1994 |
| JP | 08065647 A | 3/1996 |
| JP | 9-134194 | 5/1997 |

OTHER PUBLICATIONS

Erber, <<Effects of angle, distance, and illumination on visual reception of speech by profoundly deaf children>>, Journal of Speech and Hearing Research, Central Institute for the Deaf, St. Louis, Missouri, pp. 99-112 (Publication Nov. 19, 1973).

* cited by examiner

VIDEO-ASSISTED APPARATUS FOR HEARING IMPAIRED PERSONS

CROSS-REFERENCE DATA

This is a Continuation-in-Part of U.S. patent application No. 08/867,024 filed on Jun. 2, 1997 now abandoned, by the present applicant.

FIELD OF THE INVENTION

The present invention relates to aid apparatuses for hearing impaired persons, and more particularly to a video-assisted apparatus for hearing impaired persons.

BACKGROUND OF THE INVENTION

It is common for hearing impaired persons to use portable amplifier devices that can be hooked on and supported by the ear, and more particularly behind the auricle, with a semi-flexible pipe extending into the acoustic meatus. These devices amplify the sounds so as to allow the hearing impaired person to more clearly hear surrounding sounds. Howver, when the hearing disability is acute, or when the person is completely deaf, these amplifier devices may not be sufficient or may be entirely useless.

People with this acute hearing disability or complete deafness communicate via a sign language and via reading the movement of the lips of the person transmitting information. Even when the hearing disability is not extremely important, reading the lips of the interlocutor is computer practice, and can be used concurrently with the hearing aid device, to help understand the sometimes less understandable pronunciation of a speaker person. When the speaker does not have free access to use its hands during conversation, especially teachers having to manipulate board chalks, notes for their courses or other devices, the reading of the lips takes a particular importance, since sign language cannot be relied upon.

However, for the lip reading to be readily accomplished, the teacher must always face its class students. Moreover, the number of students is then limited, because of the maximum distance from the teacher which can be tolerated, for lip reading by a student located far away from the teacher will be significantly hampered, if not completely impossible. Also, a teacher facing a particular portion of the class students would do so to the detriment of others. Finally, the teacher may not readily use the blackboard usually located at the front end of the class, behind the teacher, while simultaneously talking, for the teacher would then be turning his back to the class students, who could not see his lips and therefore could not accomplish the lip reading.

In an era where most types of professions are accessible to the hearing impaired or deaf persons, it is possible also that the teacher be called upon to manipulate machinery, work on wood components, or work in many other fields requiring hand held equipment, in which sign language is difficult, if not impossible, during the equipment operation, and in which lip reading can be difficult, depending on the equipment used.

U.S. Pat. No. 5,886,735 issued in 1999 to E. T. Bullister shows a headset including a head-engaging frame supporting a camera which, directly or through a reflecting mirror, will film the facial area of the person wearing the headset. The headset can be provided with a microphone. The person wearing the headset is thus able to transmit both his image and his speech through computerised means, for allowing videoconferencing. The subject matter disclosed in the Bullister patent is especially oriented towards the question of the correction of the distortion of the image obtained by the camera, since the camera is positioned in a closely adjacent fashion relative to the face of the person wearing the headset.

One problem with the system disclosed in the Bullister patent is that the image transmission does not occur in real time. According to the person skilled in the art of the present invention, real time is defined as a maximum delay of 33 msec (milliseconds) between the moment when the image is perceived and the moment when the sound is perceived (c.f. "The Effect of Imperfect Cues on the Reception of Cued Speech", written by Maroula Sarah Bratakos of the Massachusetts Institute of Technology, September 1995). In the Bullister patent, software image correction occurs, while is time-consuming, i.e. at least about 500 msec for a full image. Furthermore, signal compression through a MPEG compressor takes place, which delays the image transfer of approximately 33 msec, as does the decompression through a MPEG decompressor, the latter not being shown in the Bullister patent, but being necessary to decompress the image compressed by the MPEG compressor. Thus, important delays amounting to up to 2000% and more of a real time transmission, occur with the device shown in the Bullister patent.

This relatively important time delay in the transmission of the images during video-conferencing, is not a problem with the system of the Bullister patent, since there is no need for precise real time transmission of the image in video-conferencing technology. Indeed, since the sound transferred through the computerised means can be synchronised with the image, the videoconferencing participants will not notice any time delay between the sound and the image being transferred. A 100 to 600 msec delay can occur without hampering significantly the video-conference. However, this important time delay can and does become an important problem in the field of the present invention.

Another problem associated with the system of the Bullister patent, is that it uses phone lines to transmit its information, using a modem. Again, this is not a problem in the field of video-conferencing, but is a problem in the field of the present invention. Indeed, the cumbersome computer, with wires and casings, it not adapted for high mobility purposes in which freedom of movement is required.

Yet another problem associated with the device shown in the Bullister patent, is that it includes an image correction device. The Bullister patent shows this device as either a distortion correction software, which is time consuming as detailed hereinabove; or a mirror or a lense which will both diminish the quantity of light received by the camera, and thus the image will be obscured.

International patent application filed under number PCT/JP85/00398 and published under number WO 86/01060 on Feb. 13, 1986—inventor Hiroshi ONO—discloses a data transmitting device using a telephone. FIG. 6 of the Ono patent application shows an embodiment of this invention in which a teacher uses the system according to the Ono application, for the benefit of hearing-impaired students in a class. Indeed, the teacher is equipped with a headset carrying a camera filming the teacher's lips, and transmitting this information to a screen provided on the hearing impaired student's desk to allow the student to accomplish lip-reading on the screen when he cannot directly view the teacher's lips.

An important problem with the system according to the Ono application, is that a telephone data transmission occurs. Indeed, the heart of the Ono application relies on the data phone-type transmission, including wires linking the camera headset to the end visualising screens. This is very undesirable, for three reasons:
1) the telephone system shown in the Ono application is heavy and cumbersome;
2) the wires linking all the elements are also very cumbersome, especially since they limit the movements of the teacher, who may become entangled in his wires; and
3) use of the phone lines restricts the quantity of information that can be sent to the screens; for example, conventional phone lines are limited to frequencies which are not higher than 3500 Hz, with the consequence that high-frequency syllables or letters, for example the letters "s", "f" and "th", become very difficult to hear and differentiate from one another. This is to be compared to the 20 Hz minimum to 20,000 Hz maximum range of frequency of sounds for which the normal person can be sensitive with his ears.

OBJECTS OF THE INVENTION

It is the gist of the invention to provide an apparatus for allowing hearing impaired persons or deaf persons to understand a speaker by reading his lips, while allowing this speaker to have freedom of movement, especially of his head and hands.

It is an important object of this invention that this apparatus be light and uncumbersome for the person using it.

It is yet another object of this invention that many hearing impaired or deaf persons may simultaneously profit from this apparatus used by the speaker, notwithstanding their position relative to the speaker.

It is another object of the invention to provide a device of the character described, which is to be used across short distances for allowing a low-power transmission to occur.

It is an object of the present invention that the speech and images be transmitted across two different transmission channels.

SUMMARY OF THE INVENTION

The present invention relates to a real-time video-assisted apparatus for use by a speaker and hearing impaired persons, for reproducing in real-time an image of the speaker's mouth, comprising:
a headset frame to be removably installed on the head of the speaker;
a real-time image transmission and display circuit including:
  a) a miniature camera rigidly carried by said headset from ahead of the speaker's mouth and destined to target at least the speaker's mouth for catching continuous video images therefrom;
  b) a low-power video transmitter operatively linked to said camera, for coding the video images caught by said camera and for real-time transmission thereof as a low-power wireless video signal, said video transmitter including a power device for powering said camera and said video transmitter;
  c) at least one video receiver, located substantially closely to said video transmitter, for receiving said low-power wireless video signal in real-time from said video transmitter and decoding it into video images; and
  d) at least one visualising device operatively linked to said at least one video receiver, for visualising the images decoded by said video receiver in real-time relative to the sound emitted by the speaker;

wherein said apparatus includes a real-time transmission of the images of the speaker's mouth to said at least one visualising device, whereby at least the lip movements and preferably all facial expressions of the speaker are followed in real-time simultaneously by any number of hearing impaired persons looking at the visualising device notwithstanding the head orientation or position of the speaker relative to the hearing impaired persons.

Preferably, said video transmitter emits said video signal at a maximum field strength of 50 millivolts per meter measured at a distance of three meters from said video transmitter.

Preferably, said video assisted apparatus further comprises:
a microphone carried by said headset frame and linked to an audio transmitter, for catching the sound waves emitted by the speaker's voice in a continuous fashion;
a low-power audio transmitter operatively linked to said microphone, for coding the sounds caught by said microphone and for real-time transmission thereof as a low-power wireless audio signal, said audio transmitter including a power device for powering said microphone and said audio transmitter;
at least one audio receiver, located substantially closely to said audio transmitter, for receiving said low-power wireless audio signal in real time from said audio transmitter and decoding it into sounds; and
at least one amplifying device operatively linked to said at least one audio receiver, for emitting the sounds decoded by said audio receiver in real-time relative to the sound emitted directly by the speaker;

wherein said apparatus includes a real-time transmission of the sounds of the speaker's mouth to said at least one amplifying device, whereby the speech of the speaker can be simultaneously heard directly from the speaker and through said video-assisted apparatus.

Preferably, said audio transmitter emits said audio signal at a maximum field strength of 80 millivolts per meter measured at a distance of 3 meters from said audio transmitter.

Preferably, said video transmitter and said audio transmitter are distinct, and wherein said audio receiver and said video receiver are also distinct, whereby said wireless video signal and said wireless audio signal are transmitted as two distinct signals on respective wave bands.

Preferably, said video signal is transmitted in the frequency range of 902-928 MHz, while said audio signal is transmitted in the frequency range of 72-76 MHz.

Preferably, said video transmitter and said audio transmitter are a single transmitter element, whereby said audio signal and said video signal are transmitted as a single, combined signal.

Preferably, said amplifying device is a hearing aid device.

Preferably, said microphone, said audio transmitter and said audio receiver are sensitive to a frequency range substantially within the average human sound sensitivity of 20 Hz to 20,000 Hz.

DETAILED DESCRIPTION OF THE PREFERRED EMBODIMENT

Figure 1:
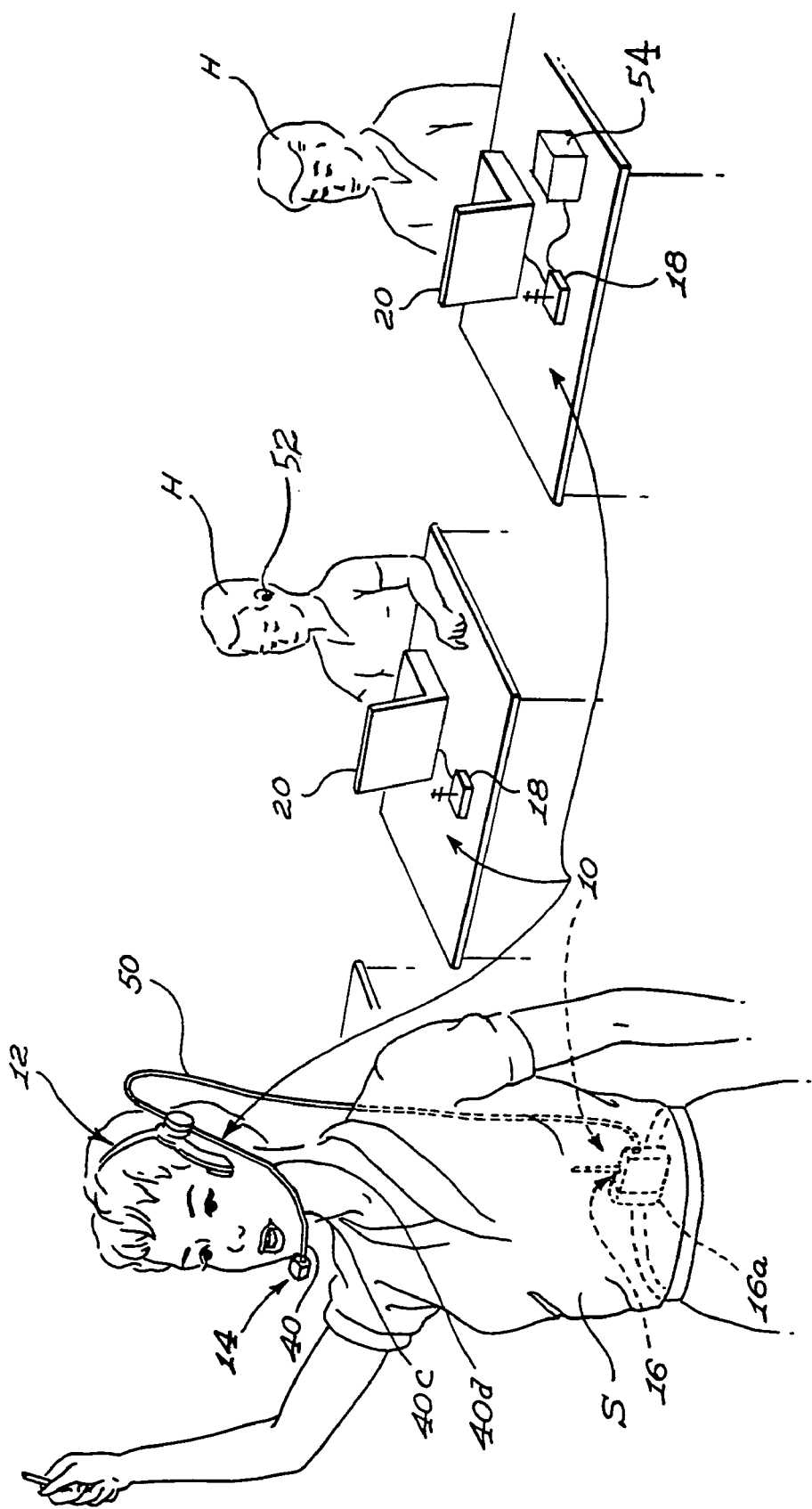
FIG. 1 is a perspective view showing a school teacher wearing a headset including to the video-assisted apparatus of the invention, with two students located behind her at their respective desks, on which are installed video monitor screens of the video-assisted apparatus.

FIG. 1 shows a preferred embodiment of a video-assisted apparatus 10 for use by a speaker S and a number of hearing impaired persons H. Apparatus 10 comprises a headset frame 12 equipped with a small camera 14, a transmitter 16, a number of remotely located receivers 18 and an equal number of visualising means in the form of television or computer screens or LCD or LED screens 20. Apparatus 10 also comprises a microphone 47.

Figure 2:
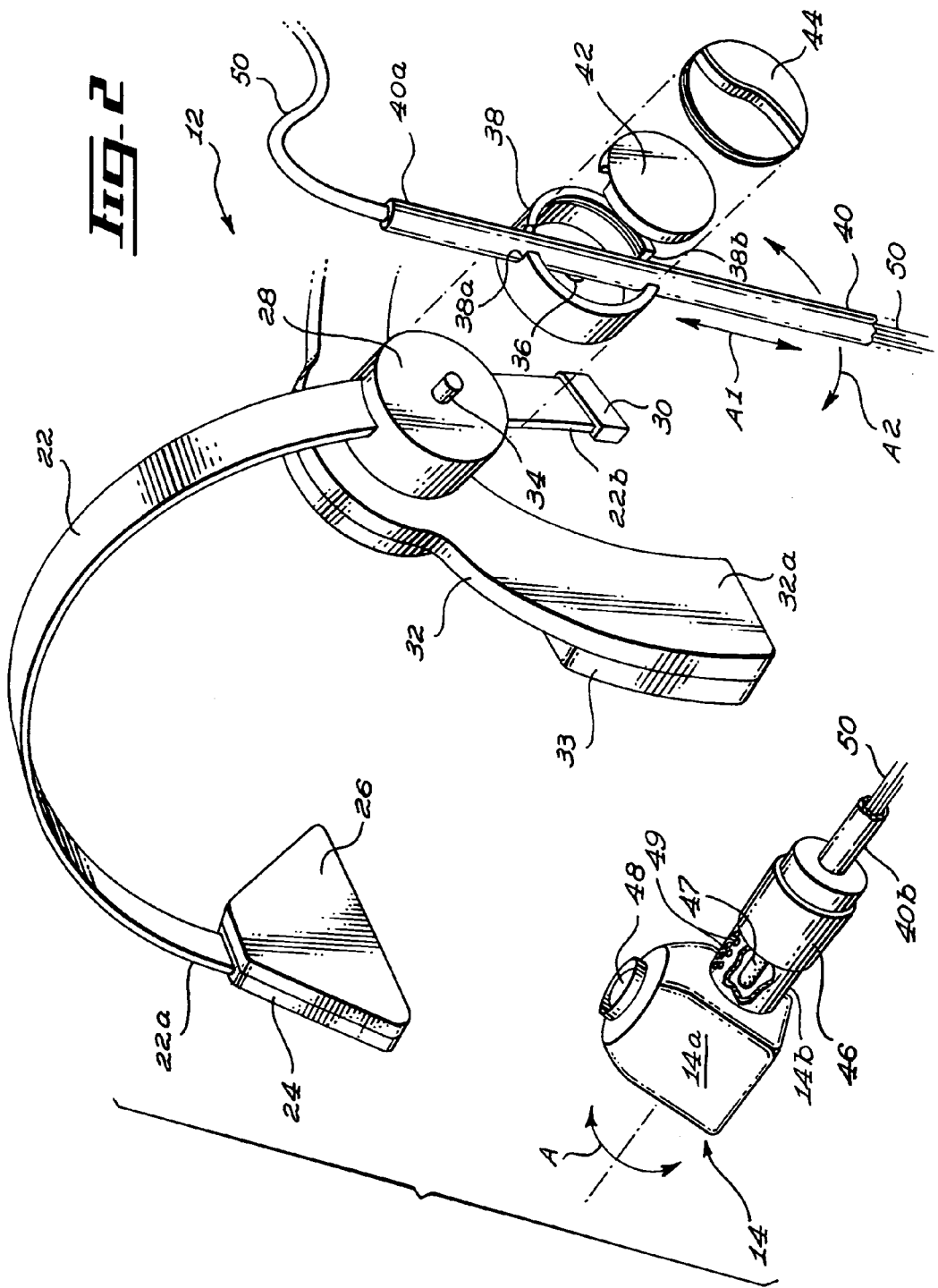
FIG. 2 is an enlarged perspective view of the headset portion of the video-assisted apparatus, with the headset being partly fragmented and with the camera support arm being partly broken, and suggesting with several arrows the possible headset adjustments for orienting and positioning the camera relative to the teacher's mouth and to compensate for various head sizes.

As shown in FIG. 2, headset frame 12 resembles conventional receptionist-style phone headset frames and comprises a flat arcuate rigid headpiece 22 defining a first and a second end 22a and 22b, headpiece 22 forming substantially a 180° (half-turn) arc. Rigid headpiece 22 comprises a slight flexibility, to allow its two ends 22a, 22b to be manually forcibly parted, to be inserted onto a persons's head and thereafter snugly engage same, as will be explained hereinafter.

On headpiece first end 22a is fixed a triangular, rigid first abutment member 24, on the interior face of which a temple padding cushion 26 is provided for the comfort of the user's head.

Headpiece 22 frictionally engages and extends through a cylindrical socket member 28 and its second end 22b is provided with a circumferential stopper 30 that prevents socket 28 from accidentally releasing headpiece 22. By forcibly sliding headpiece 22 through socket member 28 against the friction force therein, an adjustment of the dimension of headset 12 is acquired to fit heads of different sizes, as known in the art. Socket member 28 is fixedly attached to a rigid, inverted U-shaped second abutment member 32 having a pair of downwardly extending legs 32a, with only one of these legs being shown in FIG. 2 for clarity of the drawing. Each leg 32a is provided with an interior padding cushion 33, for the comfort of the user's head.

The outer flat surface of cylindrical socket 28 is equipped with a small axially projecting stud 34 which frictionally snaps into a complementary hole 36 made through the inner flat surface of a hollow cylindrical dial 38 which rests against and axially and diametrally registers with socket 28. Dial 38 has a pair of diametrally aligned notches 38a, 38b axially extending in its cylindrical peripheral surface, opposite socket 28, through which a hollow, elongated cylindrical camera supporting arm 40 is installed. An inner grooved compression cap 42 engages and holds arm 40 at the position in which it is installed, due to a threaded outer cap 44 which threadingly engages dial 38 so as to apply axial pressure on compression cap 42 which frictionally traps arm 40 in notches 38a, 38b to prevent linear displacement thereof.

Therefore, the position of arm 40 can be selectively adjusted along dial 38 by removing caps 42, 44 and sliding arm 40 inside notches 38a, 38b, as suggested by arrow A1 in FIG. 2; the position of arm 40 can then be frictionally fixed relative to dial 38 by installing caps 42, 44 and threadingly tightening outer cap 44 on dial 38. Moreover, the angular position of arm 40 can be selectively adjusted by forcibly turning dial 38 against the friction force of stud 34 against hole 36, as suggested by arrow A2 in FIG. 2, and then releasing arm 40 at the desired angular position.

Supporting arm 40 defines a first and a second opposite ends 40a, 40b, with first end 40a being located proximate dial 38 and second end 40b supporting camera 14. FIG. 1 further shows that arm 40 is elbowed at two intermediate locations, 40c and 40d, for ergonomically conforming to the general shape of the face of the speaker S, as is known in the state of the art headsets.

Camera 14 is of the conventional miniature type. Preferably, it is approximately cubic with a side dimension of approximately 1.25 centimeters. This miniature camera is small, uncumbersome and of light weight, and therefore will not hamper or distract the speaker S when she is talking. As seen in FIG. 2, camera 14 is installed on a joint 46 and has a lens 48 destined to target the mouth of the speaker, as will be explained hereinafter. Joint 46 is shown to be cylindrical and thus allow up and down orientation adjustment of lens 48 by rotation of camera 14 according to arrow A3 in FIG. 2. In an alternate embodiment, not shown, joint 46 could also be a universal ball-joint, allowing for rotation along all three perpendicular axes of camera 14, so that lens 48 may be selectively oriented in a great variety of directions.

FIGS. 1 and 2 suggest that supporting arm 40 is hollow, and houses a wire 50 connected to camera 14, running in arm 40 and protruding beyond the arm (tip) first end 40a and down behind the back of the speaker S. Wire 50 is plugged to transmitter 16 at its other (bottom) end, and thus links camera 14 thereto. Transmitter 16 includes an intrinsic and autonomous power means, preferably in the form of a portable 12 Volt battery, for powering transmitter 16, camera 14 and microphone 47. Wire 50 can be used as the antenna for transmitter 16. Preferably, a LED or another similar device is provided on transmitter 16 to indicate the level of power remaining in the battery, with the LED emitting a different colour as the battery is being gradually used up, for example green when the battery is new, switching towards a yellowish colour as the battery becomes moderately used up, and changing to a red light as the battery's life span comes to an end.

Preferably, joint 46 further carries a small microphone 47 therein, with a number of small holes 49 being provided through casing 46 for allowing the sound to reach microphone 47. This allows apparatus 10 to catch sound waves from the speaker's mouth, and transmit them to remote amplifiers, preferably the portable hearing impaired persons' amplifiers.

In use, a speaker S, such as a teacher for hearing impaired children H as shown in FIG. 1, wears headset frame 12 on her head, and adjusts the position of camera 14 relative to her mouth, by means of the rotation of dial 28, of linear displacement of arm 40 inside dial 28, and of rotation of camera 14 on joint 46. The purpose of adjusting camera 14 is for its lens 48 to precisely target the mouth of speaker S and to be located exactly ahead of the speaker's mouth, so that the images caught by camera 14 are the images of at least the mouth and preferably also all the facial expressions of the speaker S. Other adjustment means can also be envisioned for the camera 14, such as an articulated arm or any other suitable device. However, it is understood that once the positional adjustment of camera 14 is accomplished, the latter becomes rigidly supported by the headset frame 12: that is to say, the camera will then be held in a motionless fashion relative to the headset frame during use.

These images and the sound waves from the microphone are transmitted through wire 50 into transmitter 16, which codes the images into a proper signal, preferably being either one of radio waves, micro waves and infra-red waves, with the radio wave transmission being preferred over the other types of transmission. This wireless signal is transmitted by transmitter 16, as an airborne signal and received by a number of remote receivers 18 located on the desks of the hearing impaired persons H. The receivers 18 decode the signal sent by transmitter 16 into images that can be visualised by proper visualising devices 20, e.g. video monitor screens, computer screens, LED or LCD screens; and into sound that can be heard or partly heard with proper amplifier devices, such as the hearing impaired persons's hearing aids 52 or speakers 54 that are schematically shown in FIG. 1. In the case of hearing aids 52, it is understood that conventional hearing aids which include an audio signal receiver, could be used.

Thus, the hearing impaired persons H can read the lips of the speaker S at all times, even if she has her back turned to persons H, e.g. to write on a blackboard against the wall as suggested in FIG. 1, due to the image of the speaker's mouth being reproduced on the visualising screens 20 provided for the hearing impaired persons. Also, the hearing impaired persons who are not completely deaf, will be able to partly hear the voice of the speaker simultaneously, either directly and/or through the audio signal carrying the second waves caught by microphone 47. It is noted that most hearing impaired persons will in fact be able to at least partly hear certain sounds. For example, it is not an uncommon occurrence that hearing impaired persons are able to hear low frequency sounds, while not being able to hear higher frequency sounds; this hearing pathology can be seen especially with hearing-impaired children. Also, it is possible that hearing impaired persons are able to hear higher frequency sounds, while not being able to hear low frequency sounds; these last hearing problems often result from industrial-related machinery which works at low frequency. Generally, it is noted that the human hear can be sensitive to frequencies ranging from 20 Hz to 20000 Hz, and partial deafness often occurs only as applied to a portion of this frequency range for a particular individual. Thus, often with the help of amplifying hearing aid devices, the hearing impaired persons will listen to the speaker's voice and will be able to hear part of this speech, will accomplish lip reading directly on the speaker's face when the latter can be readily observed, and will use the visualising screens 20 when not able to either hear properly or to see the speaker's face and mouth to accomplish lip reading by direct eyesight.

Linking camera 14 to transmitter 16 by a wire 50 prevents transmitter 16 from having to be located on headset frame 12 proper, which would render same uncomfortably heavier. With wire 50, transmitter 16 can thus be located on a remote location on the speaker S, for example attached to her belt as shown in FIG. 1. It could also be inserted into a shirt pocket or the like. The purpose of this is to prevent this more heavy and cumbersome equipment from being supported by the speaker's head. Notwithstanding the load supported by the speaker's head, it would however be at least as convenient that the transmitter be located on the headset frame head-engaging portion, including a small antenna thereon, especially if a lighter power means and transmitter assembly is available.

FIG. 1 further shows that transmitter 16 comprises an enclosed battery section 16a, which may be distinct therefrom, wherein a power supply battery may be inserted.

A best mode embodiment of the apparatus according to the invention would enclose all speaker components inside a head set assembly.

A more simple while still acceptable embodiment of apparatus would include the following components:

Student:
   a) Video monitor—color Portavision 5 inches model, Radio Shack; or preferably, a LCD video screen, e.g. from Sony;
   b) FM receiver—model 900 AMBBR, Microtech Electronics (San Clemente, Calif.);

2) Teacher:
   a) transmitter—FM wavelength emitter, model Minilink 001823, Microtech Electronics, with on/off switch;
   b) 2×6 volts batteries, 1.2 Amp. "Exaltor";
   c) micro colour solid state board camera with 4.4 mm diameter lens, and with digital processing, model UN411E ultra micro remote colour CCD camera from "Elmo".

Obviously, the invention is not limited to such a given embodiment. The camera, in particular, may be one of many known miniature cameras sold on the market. The known technologies include optical fibre-based cameras, medical-type cameras (usually enclosed in a protective casing), or the above-mentioned solid state board camera. Other suitable image capturing devices such as CMOS imaging devices are also deemed to be included in the expression "camera". Also, it is envisioned that the transmitter be included with the camera and the microphone in a single casing.

Throughout this specification, reference has been made to hearing impaired persons; it must be understood that partly or completely deaf persons are included in the expression "hearing impaired persons".

It is an important feature of the present invention that transmission of the video and audio signals occur in real-time. As stated in the Background of the Invention section, real time is defined, according to a person skilled in the art of the present invention, as a maximum delay of 33 msec between the moment when the image is perceived and the moment when the sound is perceived by the hearing impaired person. Considering that the speaker will be emitting sound when speaking and that it is possible, or even likely, that the hearing-impaired persons will partly hear the speaker's voice directly (i.e. not through apparatus 10), then the transmission of the images and of the sounds captured through apparatus 10 must occur so that no more than 33 msec delay occurs between the image and sound capture, and the image and sound perception by the hearing-impaired person through apparatus 10. This way, the images seen of the visualising screens 20, the sounds heard through the amplifying hearing aids and the sounds heard directly from the speaker's mouth, will coincide, and any lip reading accomplished on the screens 20 will register with the voice of the speaker.

The audio signal is not problematic, since very little information is transferred therein relative to the video signal. Thus, it is easy to transmit the audio signal through apparatus 10 to the amplifying hearing aids within the 33 msec delay.

The video signal, however, is another matter, since image signals carry much more information. It is known that to capture an image and transmit it directly to a video screen, a delay of approximately 33 msec is required (i.e. 16.5 msec per half image). Thus, for the image transmission to remain within the required limit of 33 msec, the image must be transferred directly to the visualising screens 20, without any software acting on the video signal for correcting the image, because software image correction is time-consuming, i.e. at least about 500 msec for a full image. Furthermore, signal compression through a MPEG compressor takes approximately 33 msec, as does the decompression through a MPEG decompressor, and thus compression and decompression of the image signal cannot occur. Therefore, image treatment is not an option, nor is compression of the image information, or else the image seen on the visualising device by the hearing-impaired person will be sufficiently offset relative to the voice partly heard from the speaker directly through class or through a hearing aid, for the hearing-impaired person to notice this offset. Reconciling the image seen on the screen and the speaker's voice can then become very difficult, and consequently trying to understand the speech becomes confusing and a difficult, if not impossible, task.

Thus, in the present specification, when it is stated that real-time transmission of the images occurs, it is understood that the images of the speaker's mouth and face are displayed on the visualising screens 20 within a 33 msec delay. With the actual technology, this means that no image treatment will occur, such as image correction software to correct the distortion of the images caught by the camera, or compression or decompression of the image through devices such as MPEG compressors and decompressors.

According to a preferred embodiment of the invention, transmitter 16 includes a video transmitter and an audio transmitter, each distinct from the other. Thus, the audio signal and the video signal are distinctly transmitted to the receivers 18. Preferably, the video signal is transmitted on a radio wave band located in the 902-928 MHz range and the audio signal is transmitted on a radio wave band located in the 72-76 MHz range, the latter being the usual band used for hearing aid devices—and thus the system of the present invention may be compatible with conventional hearing aid devices. This low frequency for the audio signal also has the advantage of providing a more stable carrier wave, which may travel further for a same power output and which will suffer less loss of its signal. Alternately, the video signal can also be transmitted at a frequency range of 2400.0 to 2483.5 MHz, and the audio signal can also be transmitted at a frequency range of 216 to 217 MHz.

The fact that the audio and video signals are transmitted on two different bands, helps prevent the sound signal from being interrupted or polluted by video signal irregularities. Indeed, it is important to note that the video image of the speaker's mouth on the visualising screen is only a fall-back option for the hearing impaired person, who will normally read the speaker's lips directly and who will possibly partly hear the speaker's voice. The image on the screen will only be used when the speaker's lips cannot be read directly, so the sound signal often becomes more important that the image itself for the hearing-impaired persons that are equipped with a hearing aid device linked to apparatus 10. Thus, it is important that the sound signal be as clear as possible, and consequently the video image is transmitted on a different band than that of the sound signal.

It is further envisioned to use two or more redundant channels for the audio signal, from which the hearing-impaired person can choose according to the best reception.

It is noted that the transmitter and receiver of the present invention are substantially closely positioned relative to each other. Indeed, contrarily to video-conferencing devices such as the one disclosed in the above-mentioned prior art Bullister patent, the apparatus 10 according to the present invention is destined to be used in a single general area, for example a single student class. The speaker is located in front of the class with his or her transmitter, while the hearing impaired persons are seated in class at a distance with their receivers and visualising devices, with the wireless broadcast communication occurring between transmitter and receiver. This allows the system according to the present invention to use low-power transmitters, which have two very important advantages which bring about surprising and unexpected results:

1) They do not require compulsory government regulatory licenses for communication devices that are otherwise required for transmitters transmitting at higher power, these licenses being granted by a communication regulatory body in most countries, such as Canada and the United States.

2) They prevent different devices 10 according to the invention and used in a same building, e.g. in a school, from hampering one another's signals, due to the different signals which could overlap one another if more powerful transmitters were used.

The expression "low-power transmitter" includes transmitters emitting at a power which allows the air-borne wireless signal to be received in a close vicinity relative to the transmitter, e.g. in a same room or in an adjacent room, while not covering important distances. The preferred maximum field strength of the emissions originating from the transmitter of the present invention is as follows, to obviate the obligation to obtain a regulatory license according to North-American standards: 50 millivolts per meter for the video signal, and 80 millivolts per meter for the audio signal, with the measurements being taken at a distance of three meters from the transmitter. This transmitter power is enough for the purpose of transmitting the signals over short distances, e.g. in a same room or perhaps in an adjacent room at the most if little interference from the wall structure between the rooms exists, but no more than that.

Wired communication over longer distances is likely to be accomplished through a modem or the like transmitter element, with relatively much longer delays of transmission of the image, which would result in the image not being displayed in real-time. This is an important difference relative to known videoconferencing devices, which use wired communication since wireless broadcast communication would require licenses due to the large distances involved. Even in the invention disclosed in the above-mentioned Ono patent application, telephone technology is used for transmitting the data, even if radio-wave data transmission has been known and widely used for many decades.

To prevent video signal irregularities, the video transmission should be of the Double Side Band Amplitude Modulation (DSM-AM) type which substantially allows the carrier wave to be replicated or mirrored, with only the better wave received being kept for the display of the image. Alternately, the video signal can also be a numeric signal, a FM radio wave transmission, or any other suitable transmission mode.

Furthermore, a pre-emphasis is applied to the audio and video signals at the transmitter, and a de-emphasis is applied to the signals at the receiver, to help prevent undesirable noise on the signals.

An automatic gain control (AGC) circuit is preferably used to regularise the signal which is received by the receiver 18, as known in the art.

All the above-mentioned signal regulators which aim to provide the best output signal as possible for the best sound and image reproduction for the hearing-impaired person, are rather important, especially considering that the wireless transmitter is mobile, and that the speaker can and often will move as he or she speaks. This is likely to result in interference over the broadcast airborne signals, especially considering that the system 10 according to the invention is likely to be used in a closed room, the surrounding walls and building structure then promoting wave reflection and consequently interference on the signal. Thus, the numerous methods used to correct this situation and provide a signal as clear as possible, especially for the sound signal, are very advantageous.

Moreover, it is envisionsed to combine to the hearing impaired person's receiver a computer with a voice recognition software, that could put the speaker's speech in writing for ulterior revision purposes. This would be advantageous in the case of hearing impaired students, who would not have to take notes themselves during class, and who could consequently concentrate on understanding the speech of the teacher through lip-reading, instead of having to take down notes. For the voice recognition software to work properly, the audio signal must be as clear as possible. It is also possible to have a speech recognition software which would use both the audio and video signal to provide a text output, with both signals then being cross-analysed by the software; both signals then need to be as clear as possible.

Any minor modifications brought to the present invention as described herein which do not extend beyond its scope, are considered to be included therein.

For example, although each student H in FIG. 1 is shown to have one receiver 18 and one visualising screen 20 on his desk, it is understood that a single receiver 18 could be provided for a number of visualising screens 20, e.g. if all the visualising screens 20 were network-linked computer screens. Also, a single receiver could be linked to a single visualising means in the form of a screen, preferably a giant-sized screen, facing all hearing impaired persons H. Also, although much more cumbersome, copper or optic fiber wiring could be used to carry the signal from transmitter 16 to receiver 18 instead of airborne waves.

It is understood that the headset of the present invention could be modified to any other suitable desired configuration. Also, the camera support arm could be located on the right-hand side of the headset, rather than on the left-hand side as shown in the drawings.

Moreover, the apparatus described in the present disclosure can be of use for persons without any hearing disabilities, particularly for children and teenagers located too far away from a teacher and who will use lip reading as complementary means for understanding the conversation; this method helps to direct the student's attention on understanding the meaning of what is said, rather than solely directing his attention on hearing what is said. Also, the use of the present apparatus can be extended to drive-through type restaurants, where it is preferable to see the face of the restaurant employee speaking in addition to hearing his or her voice, when ordering food from a remote location outside the restaurant.

I claim:

1. A method for providing audio and visual communication between a speaker and at least one hearing impaired person, the method comprising:
   providing said speaker with a headset frame having a camera attached thereto and positioned to capture images of a mouth of said speaker;
   providing said at least one hearing impaired person with at least one display, wherein sound emitted by said speaker and received by said hearing impaired person essentially does not allow said hearing impaired person to understand said speaker;
   capturing continuous video images of said mouth of said speaker using said camera; and
   transmitting said images in real-time in an uncompressed manner to said at least one display for said at least one hearing impaired person to view such that movement of said mouth of said speaker coincides with sound emitted by said speaker and enables said hearing impaired person to understand said speaker.

2. A method as claimed in claim 1, further comprising:
   capturing continuous sound emitted by said speaker via a microphone attached to said headset frame; and
   transmitting said sound in real time to at least one amplifying device located proximate to said at least one hearing impaired person such that speech of said speaker can be simultaneously heard from said speaker and through said amplifying device.

3. A method as claimed in claim 2, wherein said transmitting said images and transmitting said sound comprises transmitting via a wireless video signal and a wireless audio signal, respectively.

4. A method as claimed in claim 3, wherein said transmitting via a wireless video signal and a wireless audio signal comprises transmitting using low-power transmissions.

5. A method as claimed in claim 1, wherein said transmitting said images comprises transmitting via a wireless video signal.

6. A method as claimed in claim 5, wherein said transmitting via a wireless video signal comprises transmitting via a low-power wireless video signal.

7. A method as claimed in claim 3, wherein said video signal and said audio signal are transmitted as two distinct signals on respective wave bands.

8. A method as claimed in claim 7, wherein said video signal is transmitted on a wave band located in a 902 to 928 MHz range, and wherein said audio signal is transmitted on a wave band located in a 72 to 76 MHz range.

9. A method as claimed in claim 2, wherein said amplifying device is a hearing aid device.

10. A method as claimed in claim 8, wherein at least two redundant channels are used for said audio signal, such that said at least one hearing impaired person can choose according to best reception.

11. A method as claimed in claim 2, wherein voice recognition is performed on said speech of said speaker to transform said speech in written form.

12. A method as claimed in claim 11, wherein said written form is output on said at least one output display for said at least one hearing impaired person to visualize.

13. A method as claimed in claim 11, wherein said voice recognition is performed on said speech and on said video images.

14. A method as claimed in claim 2, wherein said voice recognition is performed on said video images of said speaker to transform said speech into written form.

15. A method as claimed in claim 14, wherein said written form is output on said at least one display for said at least one hearing impaired person to visualize.

16. A method as claimed in claim 1, wherein each of said at least one hearing impaired person is provided with a display.

17. A method as claimed in claim 1, wherein said camera is positioned to capture images of said mouth of said speaker and facial expressions of said speaker.

18. A method as claimed in claim 1, wherein said hearing-impaired person has a diminished sense of hearing.

19. A method as claimed in claim 18, wherein said hearing impaired person has an essentially unobstructed view of said speaker and receives said sound emitted by said speaker through air.

* * * * *